United States Patent
Kuo (10) Patent No.: US 11,762,464 B1
(45) Date of Patent: Sep. 19, 2023

(54) METHOD FOR INPUTTING CHARACTERS WITH EYE GAZES, HOST, AND COMPUTER READABLE STORAGE MEDIUM

(71) Applicant: HTC Corporation, Taoyuan (TW)

(72) Inventor: Si-Huai Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/887,500

(22) Filed: Aug. 14, 2022

Related U.S. Application Data (60) Provisional application No. 63/332,698, filed on Apr. 20, 2022.

(51) Int. Cl.
*G06F 3/01* (2006.01)
*G06F 3/04842* (2022.01)

(52) U.S. Cl.
CPC .......... *G06F 3/013* (2013.01); *G06F 3/04842* (2013.01)

(58) Field of Classification Search
CPC .......... G06F 21/36; G06F 21/83; G06F 21/84; G06F 3/016; G06F 3/0346; G06F 3/04842; G06F 3/04886; G06F 2221/031
See application file for complete search history.

(56) References Cited

U.S. PATENT DOCUMENTS

| | | | |
|---|---|---|---|
| 7,986,816 B1 * | 7/2011 | Hoanca | G06V 40/18 382/280 |
| 2018/0173417 A1 * | 6/2018 | Foresti | G06F 3/013 |
| 2020/0356261 A1 * | 11/2020 | Cutler | G06F 21/83 |

* cited by examiner

*Primary Examiner* — Nelson M Rosario
(74) *Attorney, Agent, or Firm* — JCIPRNET (57) ABSTRACT

The embodiments of the disclosure provide a method for inputting characters with eye gazes, a host, and a computer readable storage medium. The method includes: providing a character inputting interface, wherein the character inputting interface comprises a first character set, and the first character set comprises a plurality of first characters; obtaining a first eye gaze position on the character inputting interface; and in response to determining that the first eye gaze position triggers a first specific character among the first characters, inputting the first specific character.

16 Claims, 6 Drawing Sheets

METHOD FOR INPUTTING CHARACTERS WITH EYE GAZES, HOST, AND COMPUTER READABLE STORAGE MEDIUM

CROSS-REFERENCE TO RELATED APPLICATION

This application claims the priority benefit of U.S. provisional application Ser. No. 63/332,698, filed on Apr. 20, 2022. The entirety of the above-mentioned patent application is hereby incorporated by reference herein and made a part of this specification.

BACKGROUND

1. Field of the Invention

The present disclosure generally relates to an inputting mechanism, in particular, to a method for inputting characters with eye gazes, a host, and a computer readable storage medium.

2. Description of Related Art

Nowadays, it common for people to manually input confidential information (e.g., passwords) in a public environment and/or to a shared machine (e.g., an automatic teller machine).

However, other people may easily obtain the inputted confidential information by observing/recording the touched keys (e.g., the touched keys on the touch screen and/or the keyboard) and the inputting order thereof. Therefore, it is crucial to design an inputting mechanism with higher security.

SUMMARY OF THE INVENTION

Accordingly, the disclosure is directed to a method for inputting characters with eye gazes, a host, and a computer readable storage medium, which may be used to solve the above technical problems.

The embodiments of the disclosure provide a method for inputting characters with eye gazes, adapted to a host. The method includes: providing a character inputting interface, wherein the character inputting interface comprises a first character set, and the first character set comprises a plurality of first characters; obtaining a first eye gaze position on the character inputting interface; and in response to determining that the first eye gaze position triggers a first specific character among the first characters, inputting the first specific character.

The embodiments of the disclosure provide a host including a storage circuit and a processor. The storage circuit stores a program code. The processor is coupled to the non-transitory storage circuit and accesses the program code to perform: providing a character inputting interface, wherein the character inputting interface comprises a first character set, and the first character set comprises a plurality of first characters; obtaining a first eye gaze position on the character inputting interface; and in response to determining that the first eye gaze position triggers a first specific character among the first characters, inputting the first specific character.

The embodiments of the disclosure provide a computer readable storage medium, the computer readable storage medium recording an executable computer program, the executable computer program being loaded by a host to perform steps of: providing a character inputting interface, wherein the character inputting interface comprises a first character set, and the first character set comprises a plurality of first characters; obtaining a first eye gaze position on the character inputting interface; and in response to determining that the first eye gaze position triggers a first specific character among the first characters, inputting the first specific character.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
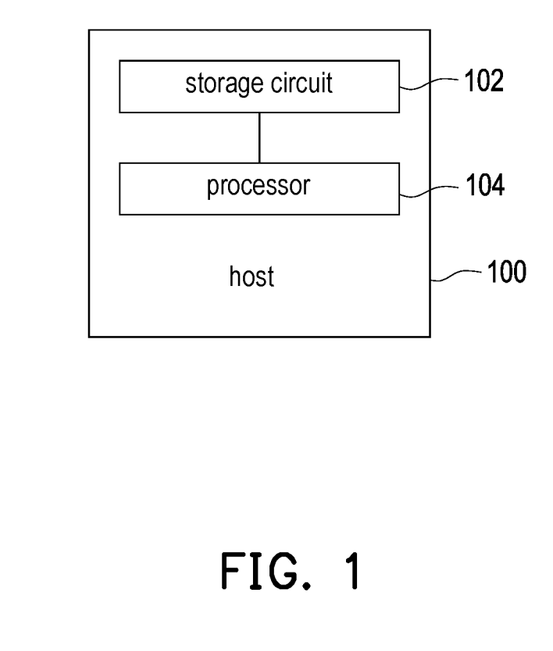
FIG. 1 shows a schematic diagram of a host according to an embodiment of the disclosure.

See FIG. 1, which shows a schematic diagram of a host according to an embodiment of the disclosure. In various embodiments, the host 100 can be any electronic device such as a smart device and/or a computer device. In some embodiments, the host 100 can be a head-mounted display (HMD) of a reality system (e.g., a VR system, an augmented reality (AR) system, a mixed reality (MR) system, or the like). In some embodiments, the host 100 can be a (stand-alone) HMD providing a visual content (e.g., a VR content) for the user/wearer to see, but the disclosure is not limited thereto.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a program code and/or a plurality of modules that can be executed by the processor 104.

The processor 104 is coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In some embodiments, the host 100 can be configured to perform eye tracking function to the user thereof. In some embodiments, the host 100 can be configured with particular cameras for capturing the images of the eyes of the user and accordingly determine the gaze position of the user.

In other embodiments, the host 100 can be connected with an external eye tracking device capable of determining the eye gaze position of the user of the host 100, and the host 100 can receive the determined eye gaze position of the user from the external eye tracking device.

In some embodiments, the host 100 can be a shared device disposed in a public environment for different people to use. In one embodiment, the shared device can be any device for different users to input (confidential) information (e.g., secret characters such as passwords), such as the automatic teller machine and/or kiosk devices, but the disclosure is not limited thereto.

In some embodiments, the host 100 can be disposed with a user interface for the user to interact with the host 100 and/or display information for the user to see. In various embodiments, the user interface can be a touch screen, a regular display, a near-eye display, and/or the like.

In the embodiments of the disclosure, the processor 104 accesses the modules and/or the program code stored in the storage circuit 102 to implement the method for inputting characters with eye gazes provided in the disclosure, which would be further discussed in the following.

Figure 2:
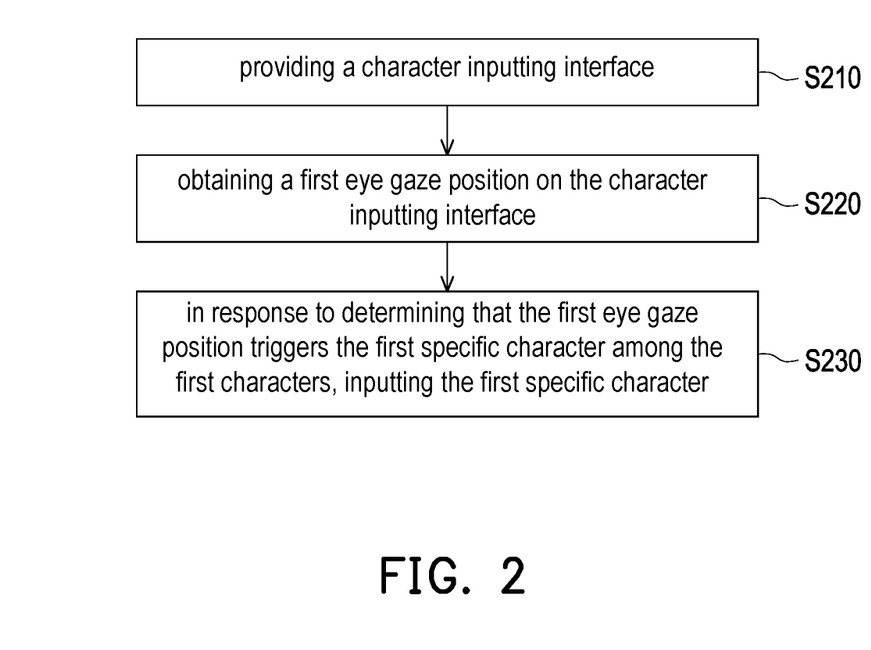
FIG. 2 shows a flow chart of the method for inputting characters with eye gazes according to a first embodiment of the disclosure.

See FIG. 2, which shows a flow chart of the method for inputting characters with eye gazes according to a first embodiment of the disclosure. The method of this embodiment may be executed by the host 100 in FIG. 1, and the details of each step in FIG. 2 will be described below with the components shown in FIG. 1. In addition, for better explaining the concept of the disclosure, FIG. 3 would be used as an example, wherein and FIG. 3 shows a schematic diagram of a character inputting interface according to the first embodiment of the disclosure.

In step S210, the processor 104 provides a character inputting interface 300. In one embodiment, the character inputting interface 300 can be shown on the user interface (e.g., a touch screen) of the host 100. In another embodiment where the host 100 is, for example, a device (e.g., a head-mounted display) for providing visual contents of reality services such as VR services, the processor 104 can provide the character inputting interface 300 in the visual content of the reality service provided by the host 100. For example, the processor 104 may provide the character inputting interface 300 in the VR content shown to the user of the host 100, but the disclosure is not limited thereto.

Figure 3:
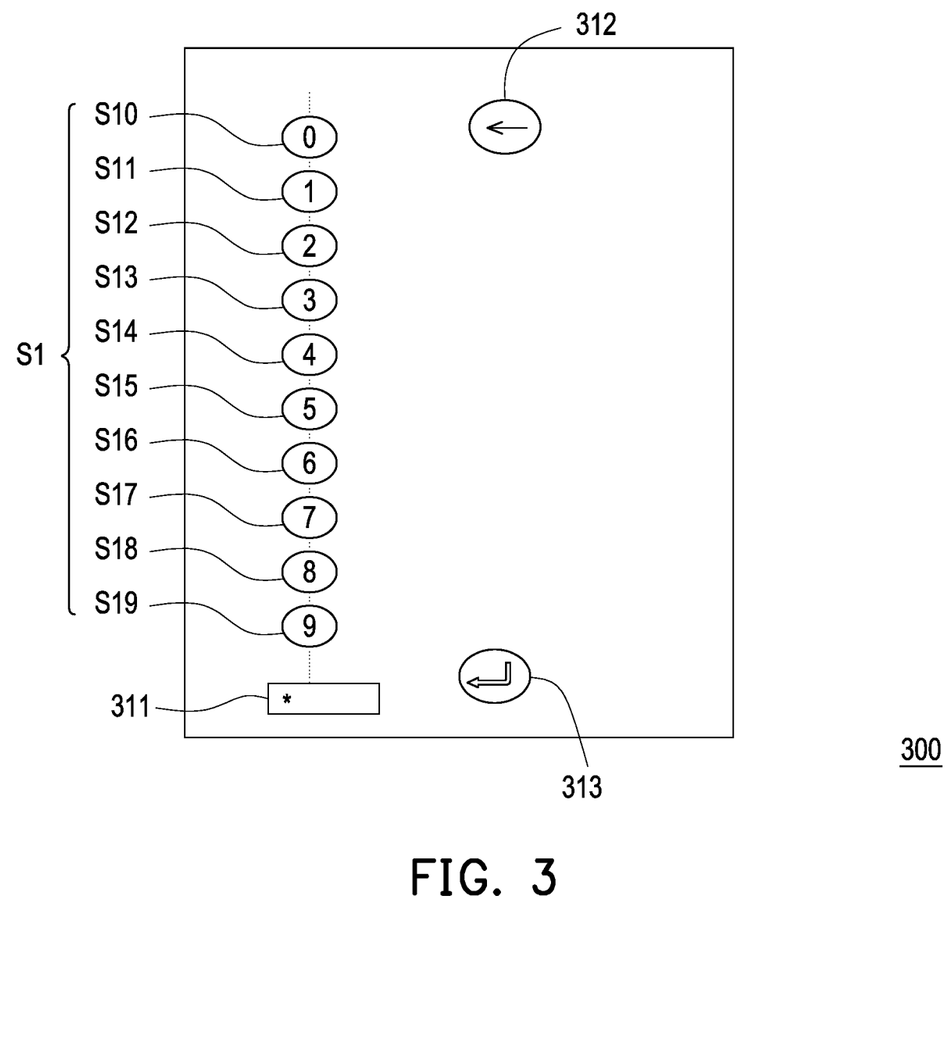
FIG. 3 shows a schematic diagram of a character inputting interface according to the first embodiment of the disclosure.

In FIG. 3, the character inputting interface 300 includes a first character set S1, and the first character set S1 includes a plurality of first characters S10-S19. In the embodiment, the first characters S10-S19 may respectively corresponds to the characters of 0-9.

In step S220, the processor 104 obtains a first eye gaze position on the character inputting interface 300. In some embodiments, the processor 104 can detect the current eye gaze position of the user on the character inputting interface 300 and/or the user interface of the host 100 as the first eye gaze position via the built-in eye tracking device. In another embodiment, the processor 104 can receive the current eye gaze position of the user on the character inputting interface 300 and/or the user interface of the host 100 from the external eye tracking device as the first eye gaze position, but the disclosure is not limited thereto.

In one embodiment, the processor 104 may determine whether the first eye gaze position triggers any of the first characters S10-S19. In one embodiment, in response to determining that the first eye gaze position has stayed on one (referred to as a first specific character) of the first characters S10-S19 for a predetermined time length (e.g., 1 second), the processor 104 may determine that the first eye gaze position has triggered the first specific character among the first characters S10-S19.

From another perspective, in response to determining that the user has gazed the region corresponding to the first specific character for the predetermined time length, the processor 104 may determine that the user intends to input the first specific character, but the disclosure is not limited thereto.

In step S230, in response to determining that the first eye gaze position triggers the first specific character among the first characters, the processor 104 inputs the first specific character.

In FIG. 3, the character inputting interface 300 may include an input box 311, and the processor 104 may show a star sign in the input box 311 in response to the inputted first specific character. For example, if the processor 104 determines that the first character S10 has been triggered, the processor 104 may input the first character S10 (e.g., the number 0) and accordingly show a star sign corresponding to the first character S10 into the input box 311, but the disclosure is not limited thereto.

In addition, the character inputting interface 300 can further include a deletion object 312 and a completion object 313. In one embodiment, if the processor 104 determines that the eye gaze position of the user triggers the deletion object 312, the processor 104 may determine to delete the latest inputted character and removing one star sign corresponding to the latest inputted character from the input box 311, but the disclosure is not limited thereto.

In one embodiment, if the processor 104 determines that the eye gaze position of the user triggers the completion object 313, the processor 104 may determine that the user has completed the character inputting behavior. Accordingly, the processor 104 may use the combination of the inputted characters to perform subsequent processing, such as verifying the user based on the combination of the inputted characters. For example, the processor 104 may determine whether the combination of the inputted characters match the user's password. If yes, the processor 104 may determine that the user has been verified; if not, the processor 104 may determine that the user is not verified, but the disclosure is not limited thereto.

In one embodiment, the processor 104 provides no visual indicator (e.g., a dot or a cross sign corresponding to the eye gaze of the user) corresponding to any eye gaze position on the character inputting interface 300. In this case, surrounding people cannot observe which of the position on the character inputting interface 300 is currently gazed by the user, such that the security of inputting characters can be improved.

In one embodiment, the processor 104 provides no visual cue on the first specific character and/or any other triggered characters. For example, the processor 104 would not highlight the first specific character and/or change the appearance (e.g., color) of the first specific character when determining that the first specific character has been triggered, and so as other triggered characters. In this case, surrounding people cannot observe which of characters on the character inputting interface 300 is currently inputted by the user, such that the security of inputting characters can be improved.

In one embodiment, before step S210, the processor 104 may provide an input activating interface in response to a character input request for the user to trigger the host 100 to show/provide the character inputting interface 300.

Figure 4:
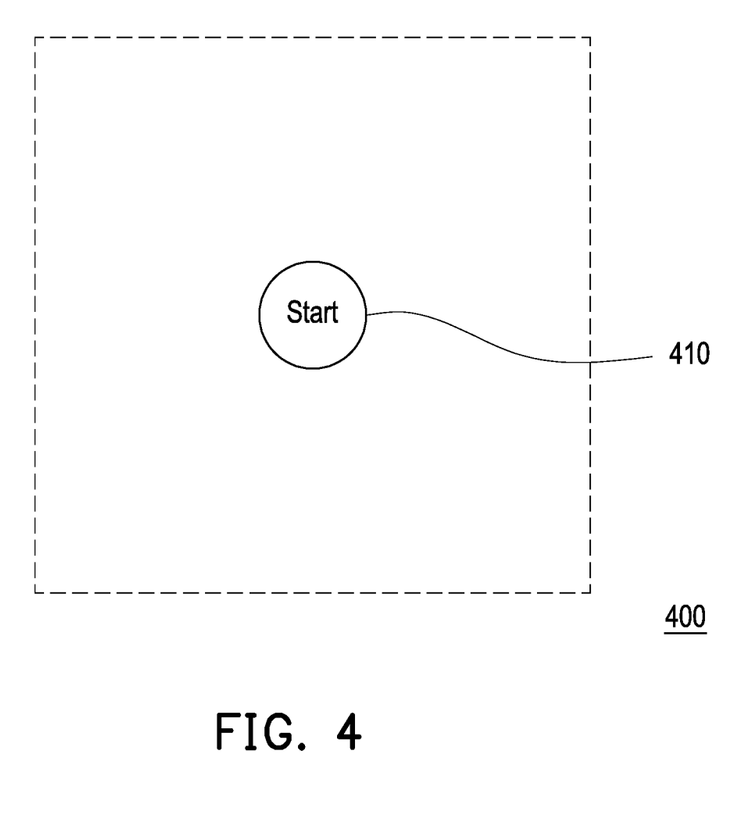
FIG. 4 shows a schematic diagram of the input activating interface according to an embodiment of the disclosure.

See FIG. 4, which shows a schematic diagram of the input activating interface according to an embodiment of the disclosure. In FIG. 4, when the user wants to input some characters, the user may trigger a character input request via, for example, touching/clicking/gazing a particular object (e.g., an input box) in the user interface. Accordingly, the processor 104 may provide the input activating interface 400 in the user interface for the user to confirm the intention of inputting characters.

In the embodiment, the input activating interface 400 may include an activation object 410. In this case, the user may, for example, gaze the activation object 410 if the user wants to input some characters. In one embodiment, in response to determining that the eye gaze position triggers the activation object 410, the processor 104 may provide the character inputting interface 300 in the user interface for the user to input characters.

Accordingly, the embodiments of the disclosure can prevent the host 100 from accidentally providing the character inputting interface 300.

Figure 5:
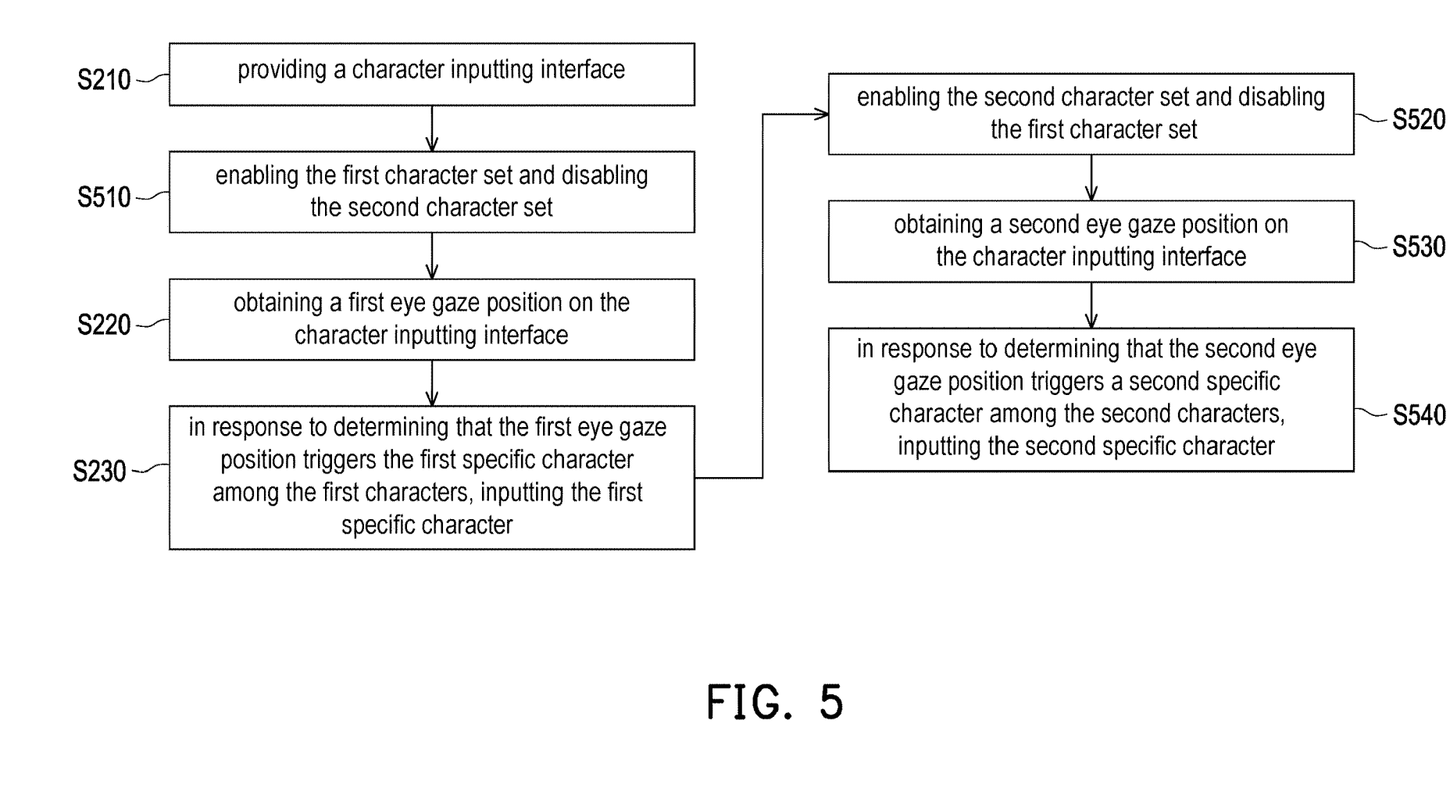
FIG. 5 shows a flow chart of the method for inputting characters with eye gazes according to a second embodiment of the disclosure.

See FIG. 5, which shows a flow chart of the method for inputting characters with eye gazes according to a second embodiment of the disclosure. The method of this embodiment may be executed by the host 100 in FIG. 1, and the details of each step in FIG. will be described below with the components shown in FIG. 1. In addition, for better explaining the concept of the disclosure, FIG. 6 would be used as an example, wherein and FIG. 6 shows a schematic diagram of a character inputting interface according to the second embodiment of the disclosure.

Figure 6:
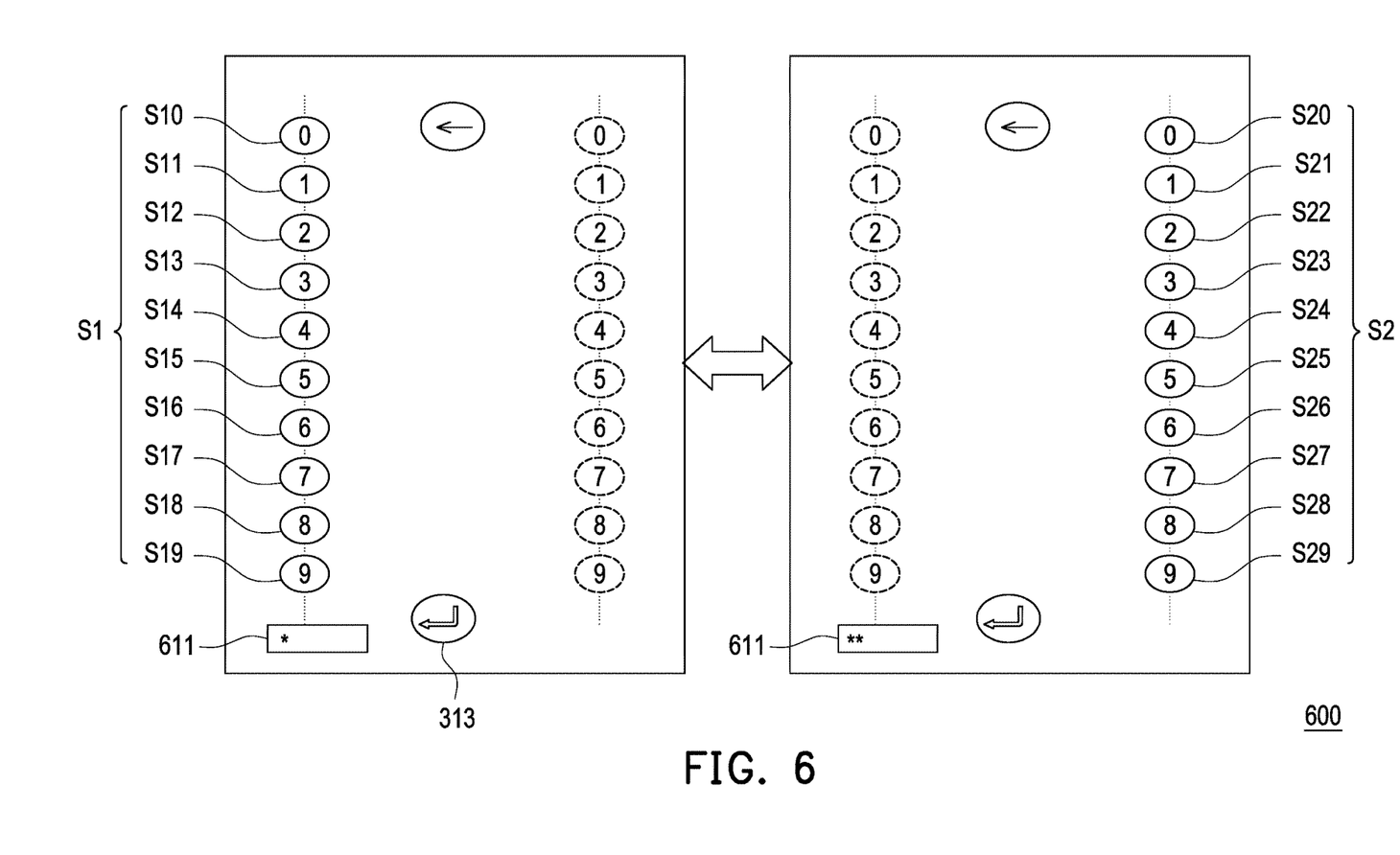
FIG. 6 shows a schematic diagram of a character inputting interface according to the second embodiment of the disclosure.

In FIG. 6, except for including all the elements in the character inputting interface 300 in FIG. 3, the character inputting interface 600 in FIG. 6 further includes a second character set S2 having a plurality of second characters S20-S29. In the embodiment, the first character set S1 and the second character set S2 are the same. i.e., the first characters S10-S19 are respectively the same as the second characters S20-S29. In other embodiments, the first character set S1 and the second character set S2 can be different by at least one character, but the disclosure is not limited thereto.

In FIG. 6, the first character set S1 can be disposed at one side (e.g., the left side) of the character inputting interface 600, and the second character set S2 can be disposed at the other side (e.g., the right side) of the character inputting interface 600.

In one embodiment, only one of the first character set S1 and the second character set S2 can be enabled for the user to input one character. That is, although the character inputting interface 600 shows the first character set S1 and the second character set S2 at the same time, the user can only use one (i.e., the enabled one) of the first character set S1 and the second character set S2 to input one character.

In one embodiment, once the processor 104 determines that the user has inputted one character with the enabled character inputting set, the processor 104 may enable the other character inputting set for the user to input another character.

In one embodiment, the enabled character set among the first character set S1 and the second character set S2 is shown in a first visual type (e.g., shown in a first color), and a disabled character set among the first character set S1 and the second character set S2 is shown in a second visual type (e.g., shown in a second color).

For better explaining the concept of the disclosure, the first character set S1 would be assumed to be the character set used by the user to input one character. In this case, the processor 104 may enable the first character set S1 and disable the second character set S2 in step S510 before performing step S220 and/or after performing step S210. Accordingly, the first character set S1 would be shown in the first visual type, and the second character set S2 would be shown in the second visual type.

After enabling the first character set S1 and disabling the second character set S2, the processor 104 perform step S220 and step S230 as taught in the above.

In the embodiment where the second character set S2 is disabled, the processor 104 may determine whether the eye gaze position corresponds to any of the second characters S20-S29 in the second character set S2. In one embodiment, in response to determining that the eye gaze position corresponds to any of the second characters S20-S29 in the second character set S2, the processor 104 may not input any of the second characters S20-S29.

In one embodiment, after the processor 104 inputs the first specific character among the first characters S10-S19 in step S230, the processor 104 may enable the second character set S2 and disable the first character set S1 in step S520. Accordingly, the second character set S2 would be changed to the first visual type, and the first character set S1 would be changed to the second visual type.

In FIG. 6, the processor 104 provides no visual indicator corresponding to any eye gaze position on the character inputting interface 600. In addition, the processor 104 provides no visual cue on the first specific character and/or any other triggered characters. Therefore, the surrounding people are not able to see which character/characters is/are inputted.

In the embodiment, since the processor 104 changes the second character set S2 to the first visual type after inputting the first specific character, the user would know that one character among the first characters S10-S19 has been successfully inputted, even if there is no visual indicator corresponding to the eye gaze position and/or no visual cue on the first specific character.

In the embodiment where the first character set S1 is disabled, the processor 104 may determine whether the eye gaze position corresponds to any of the first characters S10-S19 in the first character set S1. In one embodiment, in response to determining that the eye gaze position corresponds to any of the first characters S10-S19 in the first character set S1, the processor 104 may not input any of the first characters S10-S19.

In step S530, the processor 104 obtains a second eye gaze position on the character inputting interface 600. In some embodiments, the processor 104 can detect the current eye gaze position of the user on the character inputting interface 600 and/or the user interface of the host 100 as the second eye gaze position via the built-in eye tracking device. In another embodiment, the processor 104 can receive the current eye gaze position of the user on the character inputting interface 600 and/or the user interface of the host 100 from the external eye tracking device as the second eye gaze position, but the disclosure is not limited thereto.

In one embodiment, the processor 104 may determine whether the second eye gaze position triggers any of the second characters S20-S29. In one embodiment, in response to determining that the second eye gaze position has stayed on one (referred to as a second specific character) of the second characters S21-S29 for a predetermined time length (e.g., 1 second), the processor 104 may determine that the second eye gaze position has triggered the second specific character among the second characters S21-S29.

From another perspective, in response to determining that the user has gazed the region corresponding to the second specific character for the predetermined time length, the processor 104 may determine that the user intends to input the second specific character, but the disclosure is not limited thereto.

In step S540, in response to determining that the second eye gaze position triggers the second specific character among the second characters S21-S29, the processor 104 inputs the second specific character.

In FIG. 6, the character inputting interface 600 may include an input box 611, and the processor 104 may show another star sign in the input box 611 in response to the inputted second specific character. For example, if the processor 104 determines that the second character S21 has been triggered, the processor 104 may input the second character S21 (e.g., the number 1) and accordingly show another star sign in the input box 611, but the disclosure is not limited thereto.

In one embodiment, after the processor 104 inputs the second specific character, the processor 104 can enable the first character set S1 and disable the second character set S2, such that the user can input another character with the first character set S1, wherein the second character set S2 would be changed to the second visual type, and the first character set S1 would be changed to the first visual type.

In the embodiment, since the processor 104 changes the first character set S1 to the first visual type after inputting the second specific character, the user would know that one character among the second characters S20-S29 has been successfully inputted, even if there is no visual indicator corresponding to the eye gaze position and/or no visual cue on the second specific character.

After the processor 104 inputs another character with the first character set, the processor 104 can subsequently disable the first character set S1 and enable the second character set S2, such that the user can input another character with the second character set S2, wherein the first character set S1 would be changed to the second visual type, and the second character set S2 would be changed to the first visual type.

In brief, the processor 104 can alternately perform the following operations: (1) enabling the first character set S1 and disabling the second character set S2 for the user to input one character with the first character set S1; (2) disabling the first character set S1 and enabling the second character set S2 for the user to input one character with the second character set S2.

In one embodiment, if the processor 104 determines that the eye gaze position of the user triggers the completion object 313, the processor 104 may determine that the user has completed the character inputting behavior. Accordingly, the processor 104 may use the combination of the inputted characters to perform subsequent processing, such as verifying the user based on the combination of the inputted characters, etc.

In FIG. 6, there is a blank region with no character existing between the first character ser S1 and the second character set S2. From another perspective, there is no character existing between any one of the first characters S10-S19 and any one of the second characters S20-S29. Accordingly, no character would be accidentally triggered while the user moves the eye gaze position in between the first character set S1 and the second character set S2, but the disclosure is not limited thereto. More specifically, if the character inputting interface 600 only include the first character set S1 but not the second character set S2, the user may accidentally trigger undesired characters when moving the eye gaze position among the first characters S10-S19. For example, if the user wants to trigger the first character S17 after triggering the first character S11, the user's eye gaze may pass the first characters S12-S16 during moving the eye gaze from the first character S11 to the first character S17, which may accidentally trigger one of the first characters S12-S16.

However, since there is a blank region disposed between the first character set S1 and the second character set S2, the possibility for the user to trigger undesired characters during moving eye gaze back and forth between the first character set S1 and the second character set S2 would be reduced.

In other embodiments, the layout of the first character set S1 and the second character set S2 can be arbitrarily designed based on the requirements of the designer.

In one embodiment, the first character set S1 and/or the second character set S2 can be designed to merely include characters corresponding to numbers. In other embodiments, the first character set S1 and/or the second character set S2 can be designed to include characters corresponding to numbers, letters of alphabet, texts and/or combinations, but the disclosure is not limited thereto.

The disclosure further provides a computer readable storage medium for executing the method for inputting characters with eye gazes. The computer readable storage medium is composed of a plurality of program instructions (for example, a setting program instruction and a deployment program instruction) embodied therein. These program instructions can be loaded into the host 100 and executed by the same to execute the method for inputting characters with eye gazes and the functions of the host 100 described above.

In summary, the embodiments of the disclosure provide a mechanism for the user to input characters with eye gazes. Accordingly, the user can input characters in less observable way, which improves the security of inputting characters. In some embodiments, no visual indicator of the eye gaze point and/or no visual cue corresponding to the inputted/selected character would be provided, and hence the security of inputting characters can be further improved.

In addition, the embodiments of the disclosure can provide two or more (identical) character sets in the character inputting interface, and the character sets can be alternately enabled for the user to input one character with the enabled character set for each time. Accordingly, the embodiments of the disclosure provide a novel way for inputting characters with eye gazes.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for inputting characters with eye gazes, adapted to a host, comprising:
providing a character inputting interface, wherein the character inputting interface comprises a first character set and a second character set, wherein the first character set comprises a plurality of first characters, and the second character set has a plurality of second characters;

enabling the first character set and disabling the second character set;

obtaining a first eye gaze position on the character inputting interface;

in response to determining that the first eye gaze position triggers a first specific character among the first characters in the enabled first character set, inputting the first specific character;

enabling the second character set and disabling the first character set; and obtaining a second eye gaze position on the character inputting interface; and in response to determining that the second eye gaze position triggers a second specific character among the second characters in the enabled second character set, inputting the second specific character.

2. The method according to claim 1, wherein the character inputting interface is used for inputting secret characters.

3. The method according to claim 1, further comprising:
enabling the first character set and disabling the second character set.

4. The method according to claim 1, wherein an enabled character set among the first character set and the second character set is shown in a first visual type, and a disabled character set among the first character set and the second character set is shown in a second visual type.

5. The method according to claim 1, wherein the first character set and the second character set are the same.

6. The method according to claim 1, wherein there is a blank region with no character existing between the first character set and the second character set.

7. The method according to claim 1, further comprising:
in response to determining that an eye gaze position corresponds to any of the second characters in the second character set, not inputting any of the second characters.

8. The method according to claim 1, further comprising:
providing no visual indicator corresponding to any eye gaze position on the character inputting interface.

9. The method according to claim 1, further comprising:
providing no visual cue on the first specific character.

10. The method according to claim 1, wherein the character inputting interface has an input box, and the method further comprises:
showing a star sign in the input box in response to the inputted first specific character.

11. The method according to claim 1, further comprising:
in response to determining that the first eye gaze position has stayed on the first specific character for a predetermined time length, determining that the first eye gaze position has triggered the first specific character.

12. The method according to claim 1, wherein before the step of providing the character inputting interface, the method further comprises:
in response to receiving a character input request, providing an input activating interface, wherein the input activating interface comprises an activation object;
in response to determining that an eye gaze position triggers the activation object, providing the character inputting interface.

13. The method according to claim 1, comprising:
providing the character inputting interface in a visual content of a reality service provided by the host.

14. A host, comprising:
a non-transitory storage circuit, storing a program code:
a processor, coupled to the non-transitory storage circuit and accessing the program code to perform:
providing a character inputting interface, wherein the character inputting interface comprises a first character set and a second character set, wherein the first character set comprises a plurality of first characters, and the second character set has a plurality of second characters;
enabling the first character set and disabling the second character set;
obtaining a first eye gaze position on the character inputting interface;
in response to determining that the first eye gaze position triggers a first specific character among the first characters in the enabled first character set, inputting the first specific character;
enabling the second character set and disabling the first character set; and
obtaining a second eye gaze position on the character inputting interface; and
in response to determining that the second eye gaze position triggers a second specific character among the second characters in the enabled second character set, inputting the second specific character.

15. The host according to claim 14, wherein an enabled character set among the first character set and the second character set is shown in a first visual type, and a disabled character set among the first character set and the second character set is shown in a second visual type.

16. A non-transitory computer readable storage medium, the computer readable storage medium recording an executable computer program, the executable computer program being loaded by a host to perform steps of:
providing a character inputting interface, wherein the character inputting interface comprises a first character set and a second character set, wherein the first character set comprises a plurality of first characters, and the second character set has a plurality of second characters;
enabling the first character set and disabling the second character set;
obtaining a first eye gaze position on the character inputting interface;
in response to determining that the first eye gaze position triggers a first specific character among the first characters in the enabled first character set, inputting the first specific character;
enabling the second character set and disabling the first character set; and
obtaining a second eye gaze position on the character inputting interface; and
in response to determining that the second eye gaze position triggers a second specific character among the second characters in the enabled second character set, inputting the second specific character.

* * * * *